(12) United States Patent
Yun et al.

(10) Patent No.: US 12,372,692 B2
(45) Date of Patent: Jul. 29, 2025

(54) DISPLAY DEVICE AND LIGHT ABSORBER FOR DISPLAY DEVICE

(71) Applicants: Samsung Display Co., Ltd., Yongin-si (KR); Seoul National University R&DB Foundation, Seoul (KR)

(72) Inventors: Sanghyun Yun, Sejong-si (KR); Jae Pil Kim, Seoul (KR); Hoon Kang, Yongin-si (KR); Suhyeon Kim, Seoul (KR); Tae Gyu Hwang, Seoul (KR); Jin woong Namgoong, Seoul (KR)

(73) Assignees: Samsung Display Co., Ltd., Yongin-si (KR); Seoul National University R&DB Foundation, Seoul (KR)

( * ) Notice: Subject to any disclaimer, the term of this patent is extended or adjusted under 35 U.S.C. 154(b) by 626 days.

(21) Appl. No.: 17/224,642

(22) Filed: Apr. 7, 2021

(65) Prior Publication Data

US 2022/0035080 A1     Feb. 3, 2022

(30) Foreign Application Priority Data

Jul. 28, 2020    (KR) .................. 10-2020-0093624

(51) Int. Cl.
*G02B 5/00*        (2006.01)
*G02B 5/22*        (2006.01)
(Continued)

(52) U.S. Cl.
CPC .............. *G02B 5/003* (2013.01); *G02B 5/223* (2013.01); *G02F 1/01791* (2021.01);
(Continued)

(58) Field of Classification Search
None
See application file for complete search history.

(56) References Cited

U.S. PATENT DOCUMENTS 5,516,914 A    5/1996   Winter et al.
6,368,724 B1   4/2002   Fagerburg
(Continued)

FOREIGN PATENT DOCUMENTS

CN       100402507 C    7/2008
JP         4202115 B2    12/2008
(Continued)

OTHER PUBLICATIONS

Suhyeon Kim et al., "Effect of linker moiety on linear dimeric benzotriazole derivatives as highly stable UV absorber for transparent polyimide film", Dyes and Pigments, vol. 180 (2020), pp. 1-10.

(Continued)

*Primary Examiner* — Eli D. Strah
(74) *Attorney, Agent, or Firm* — Womble Bond Dickinson (US) LLP

(57) ABSTRACT

A display device includes a substrate, a display element layer disposed on the substrate, and a protective layer disposed on the display element layer. The display device contains a light absorber represented by Formula 1, and the damage to the display device that may be caused by the UV-A light in the wavelength range of about 315 nm to about 400 nm may be prevented or reduced, and the reliability of the display device may be maintained:

(Continued)

US 12,372,692 B2
Page 2

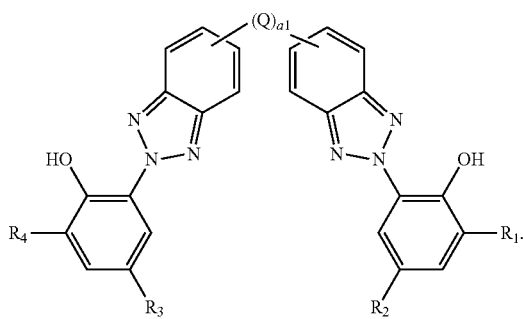

Formula 1

19 Claims, 6 Drawing Sheets

(51) Int. Cl.
*G02F 1/017* (2006.01)
*B82Y 20/00* (2011.01)
*B82Y 30/00* (2011.01)
(52) U.S. Cl.
CPC ............... *B82Y 20/00* (2013.01); *B82Y 30/00* (2013.01); *C09K 2323/031* (2020.08)

(56) References Cited

U.S. PATENT DOCUMENTS

| | | | |
|---|---|---|---|
| 6,387,992 B1* | 5/2002 | Pastor | C07D 403/04 |
| | | | 546/13 |
| 6,515,051 B2 | 2/2003 | Ravichandran et al. | |
| 6,649,770 B1* | 11/2003 | Pastor | C07D 409/14 |
| | | | 548/260 |
| 7,288,583 B2 | 10/2007 | Andrews et al. | |
| 2019/0113791 A1* | 4/2019 | Yamamoto | B32B 27/08 |
| 2019/0280224 A1* | 9/2019 | Wang | H10K 59/12 |

FOREIGN PATENT DOCUMENTS

| | | |
|---|---|---|
| JP | 2013-003488 A | 1/2013 |
| KR | 0177044 B1 | 3/1999 |
| KR | 10-0689232 B1 | 3/2007 |
| KR | 10-2017-0034045 A | 3/2017 |
| KR | 10-20190107241 A | 9/2019 |
| WO | 0242281 A1 | 5/2002 |
| WO | WO 2017/142184 A1 | 8/2017 |

OTHER PUBLICATIONS

Sheyang Xu et al., "Synthesis and Characterization of a Bisbenzotriazole Derivative and Its Application in PVC as an Ultraviolet Absorber", Journal of Vinyl & Additive Technology, Society of Plastic Engineers (2007), pp. 195-200.

* cited by examiner

DISPLAY DEVICE AND LIGHT ABSORBER FOR DISPLAY DEVICE

CROSS-REFERENCE TO RELATED APPLICATION

This application claims priority to and the benefit of Korean Patent Application No. 10-2020-0093624, filed on Jul. 28, 2020, the entire content of which is hereby incorporated by reference.

BACKGROUND

1. Field

One or more embodiments of the present disclosure herein relate to a display device and a light absorber used therein.

2. Description of the Related Art

Ultraviolet rays included in sunlight may be divided into UV-A, UV-B, and UV-C. UV-A represents a wavelength range of 315-400 nm, UV-B represents a wavelength range of 280-315 nm, and UV-C represents a wavelength range of 100-280 nm. Most UV-B and UV-C rays are absorbed by the ozone layer, whereas UV-A may reach the Earth's surface to have a negative effect on organisms.

A display device includes various organic materials, and therefore studies are being carried out in order to prevent or reduce the damage to the display device from UV-A rays.

SUMMARY

One or more aspects of embodiments of the present disclosure are directed to a display device having improved reliability by including a light absorber having increased absorbance with respect to ultraviolet rays.

One or more aspects of embodiments of the present disclosure are also directed towards a light absorber having improved heat resistance and increased absorbance with respect to ultraviolet rays.

One or more embodiments of the present disclosure provide a display device including: a substrate; a display element layer disposed (e.g., positioned or provided) on the substrate; and a protective layer disposed on the display element layer, wherein at least one of the substrate, the display element layer, or the protective layer contains a light absorber represented by Formula 1:

Formula 1

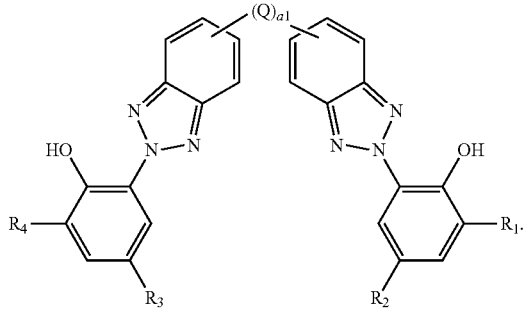

In Formula 1, a1 is an integer of 1 to 10, Q is a substituted or unsubstituted arylene group having 6 to 30 ring-forming carbon atoms, or a substituted or unsubstituted heteroarylene group having 2 to 30 ring-forming carbon atoms, and $R_1$ to $R_4$ are each independently a hydrogen atom, a deuterium atom, a halogen atom, a substituted or unsubstituted alkyl group having 1 to 20 carbon atoms, a substituted or unsubstituted aryl group having 6 to 30 ring-forming carbon atoms, or a substituted or unsubstituted heteroaryl group having 2 to 30 ring-forming carbon atoms.

In one or more embodiments, the substrate and the protective layer each may have a transmittance of about 85% or more in a wavelength range of about 400 nm to about 800 nm.

In one or more embodiments, the display element layer may include: a plurality of light emitting elements, each of the plurality of light emitting elements including a first electrode and a second electrode facing each other, an emission layer disposed between the first electrode and the second electrode; and a pixel defining film disposed between the respective first electrodes of adjacent ones of the plurality of light emitting elements, and the pixel defining film may contain the light absorber.

In one or more embodiments, the display element layer may further include an encapsulation layer disposed on the second electrode, and the encapsulation layer may contain the light absorber.

In one or more embodiments, one of the substrate, the display element layer, or the protective layer may contain the light absorber, and the content of the one of the light absorber in the substrate, the display element layer, or the protective layer containing the light absorber may be about 0.03 to 0.50 wt % and exclusive of 0.50 wt %, based on a total weight of the one of the substrate, the display element layer, or the protective layer.

In one or more embodiments, the light absorber may absorb light in a wavelength range of about 315 nm to about 400 nm.

In one or more embodiments, the light absorber may have the maximum value of absorbance of about 0.25 to about 0.45 in a wavelength range of about 315 nm to about 400 nm.

In one or more embodiments, the light absorber may have the maximum value of absorbance in a wavelength range of about 350 nm to about 370 nm.

In one or more embodiments, Formula 1 may be bilaterally symmetrical with respect to Q.

In one or more embodiments, in Formula 1, $R_1$ and $R_4$ may be the same, and $R_2$ and $R_3$ may be the same.

In one or more embodiments, in Formula 1, $R_1$ to $R_4$ may be each independently a substituted or unsubstituted alkyl group having 1 to 10 carbon atoms, a substituted or unsubstituted aryl group having 6 to 20 ring-forming carbon atoms, or a substituted or unsubstituted heteroaryl group having 2 to 20 ring-forming carbon atoms.

In one or more embodiments, in Formula 1, Q may be represented by any one among Q1 to Q9:

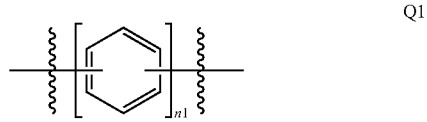

-continued

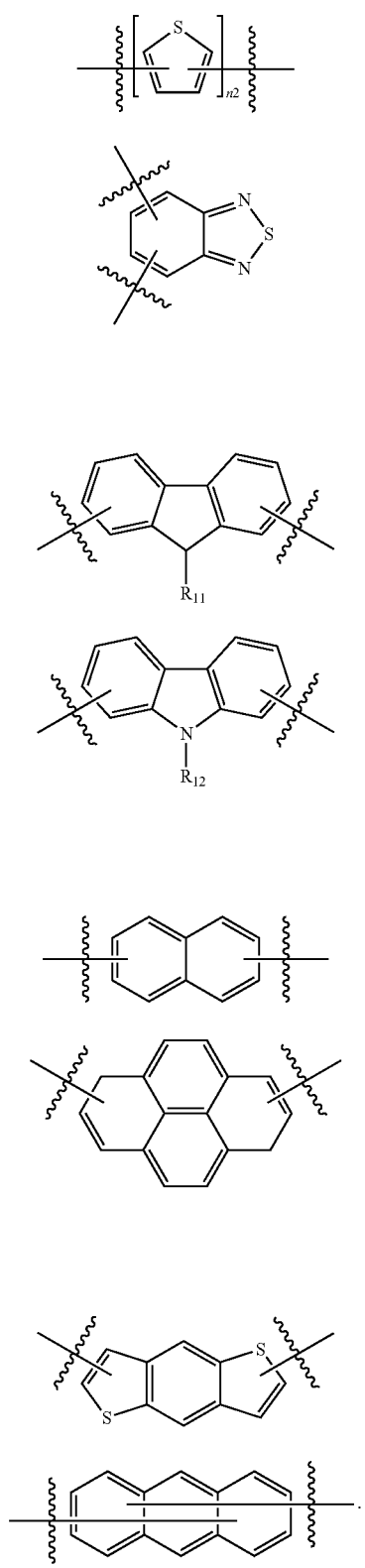

In Q1 and Q2, n1 and n2 are each independently an integer of 1 to 10, and in Q4 and Q5, $R_{11}$ and $R_{12}$ are each independently a substituted or unsubstituted alkyl group having 1 to 10 carbon atoms.

In one or more embodiments, Formula 1 may be represented by Formula 1-A:

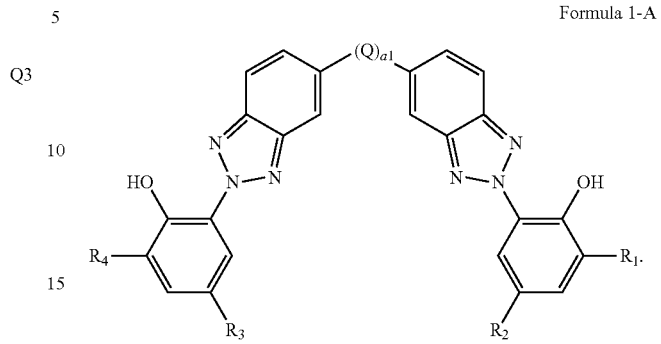

Formula 1-A

In Formula 1-A, $R_1$ to $R_4$, a1, and Q are the same as defined in Formula 1.

In one or more embodiments of the present disclosure, a light absorber is represented by Formula 1.

In one or more embodiments, the light absorber may absorb ultraviolet rays.

In one or more embodiments, $R_1$ to $R_4$ may be each independently represented by any one among R-1 to R-4:

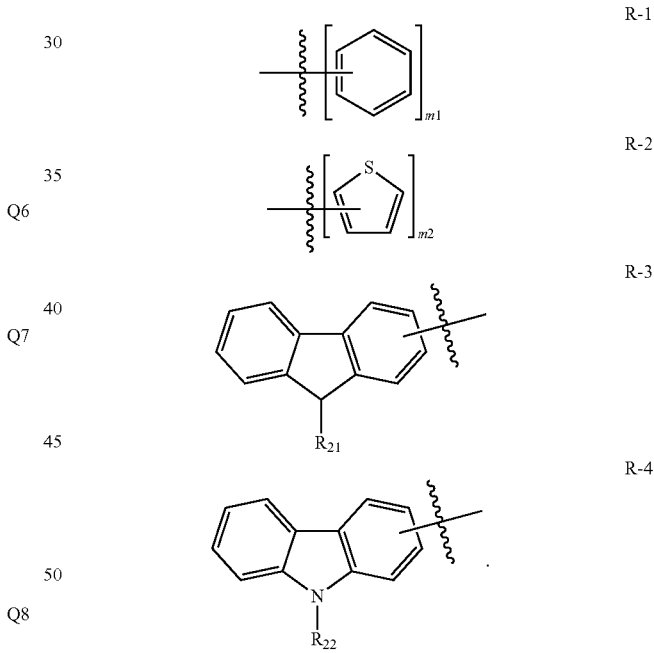

In R-1 and R-2, m1 and m2 are each independently an integer of 1 to 10, and in R-3 and R-4, $R_{21}$ and $R_{22}$ are each independently a substituted or unsubstituted alkyl group having 1 to 10 carbon atoms.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
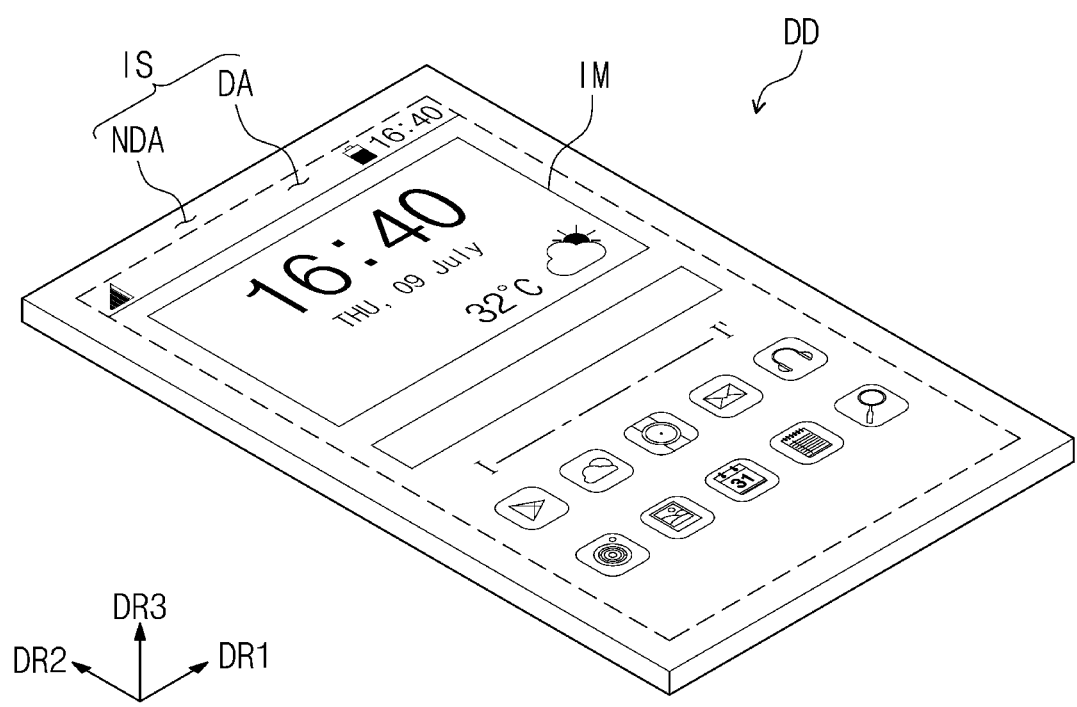
FIG. 1 is a perspective view illustrating a display device according to one or more embodiments of the present disclosure.

The present disclosure may have various modifications and may be embodied in different forms, and example embodiments will be explained in more detail with reference to the accompanying drawings. The present disclosure may, however, be embodied in different forms and should not be construed as limited to the embodiments set forth herein. Rather, all modifications, equivalents, and substituents which are included in the spirit and technical scope of the present disclosure should be included in the present disclosure.

In the present description, when an element (or an area, a layer, a portion, etc.) is referred to as being "on," "connected to," or "coupled to" another element, it means that the element may be directly disposed on/connected to/coupled to the other element (without any third elements therebetween), or that a third element may be disposed therebetween.

Like reference numerals refer to like elements throughout. Also, in the drawings, the thickness, the ratio, and the dimensions of elements are exaggerated for an effective description of technical contents.

The term "and/or" includes all combinations of one or more of which associated configurations may define. Expressions such as "at least one of," "one of," and "selected from," when preceding a list of elements, modify the entire list of elements and do not modify the individual elements of the list. Further, the use of "may" when describing embodiments of the present disclosure refers to "one or more embodiments of the present disclosure."

It will be understood that, although the terms "first," "second," etc. may be used herein to describe various elements, these elements should not be limited by these terms. These terms are only used to distinguish one element from another. For example, a first element may be referred to as a second element, and, similarly, the second element may be referred to as the first element, without departing from the scope of the present disclosure. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Hereinafter, a display apparatus according to one or more embodiments of the preset disclosure and a light absorber of one or more embodiments included therein will be described with reference to the accompanying drawings.

Figure 2:
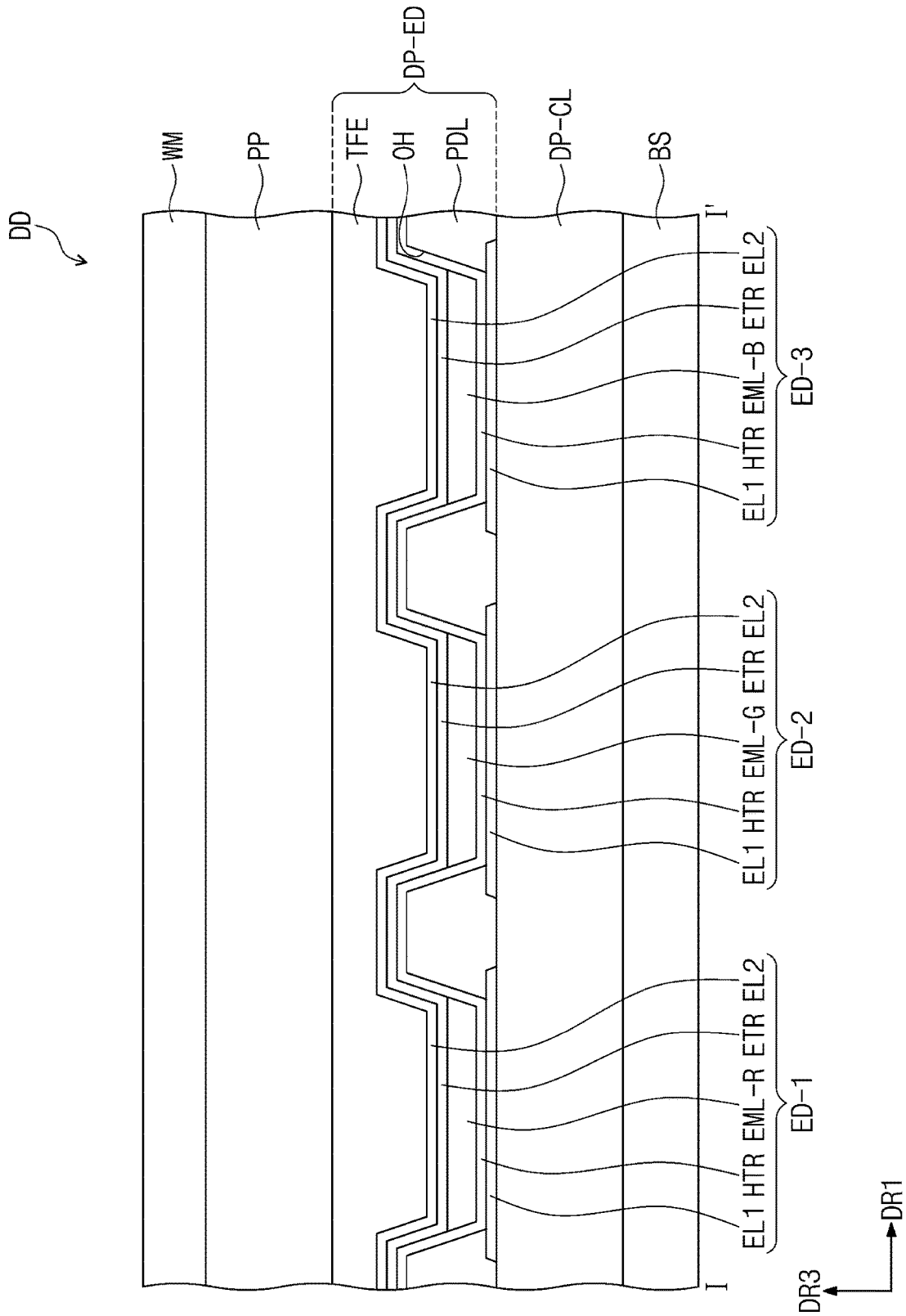
FIG. 2 is a cross-sectional view illustrating a part taken along line I-I' of FIG. 1.
Figure 3:
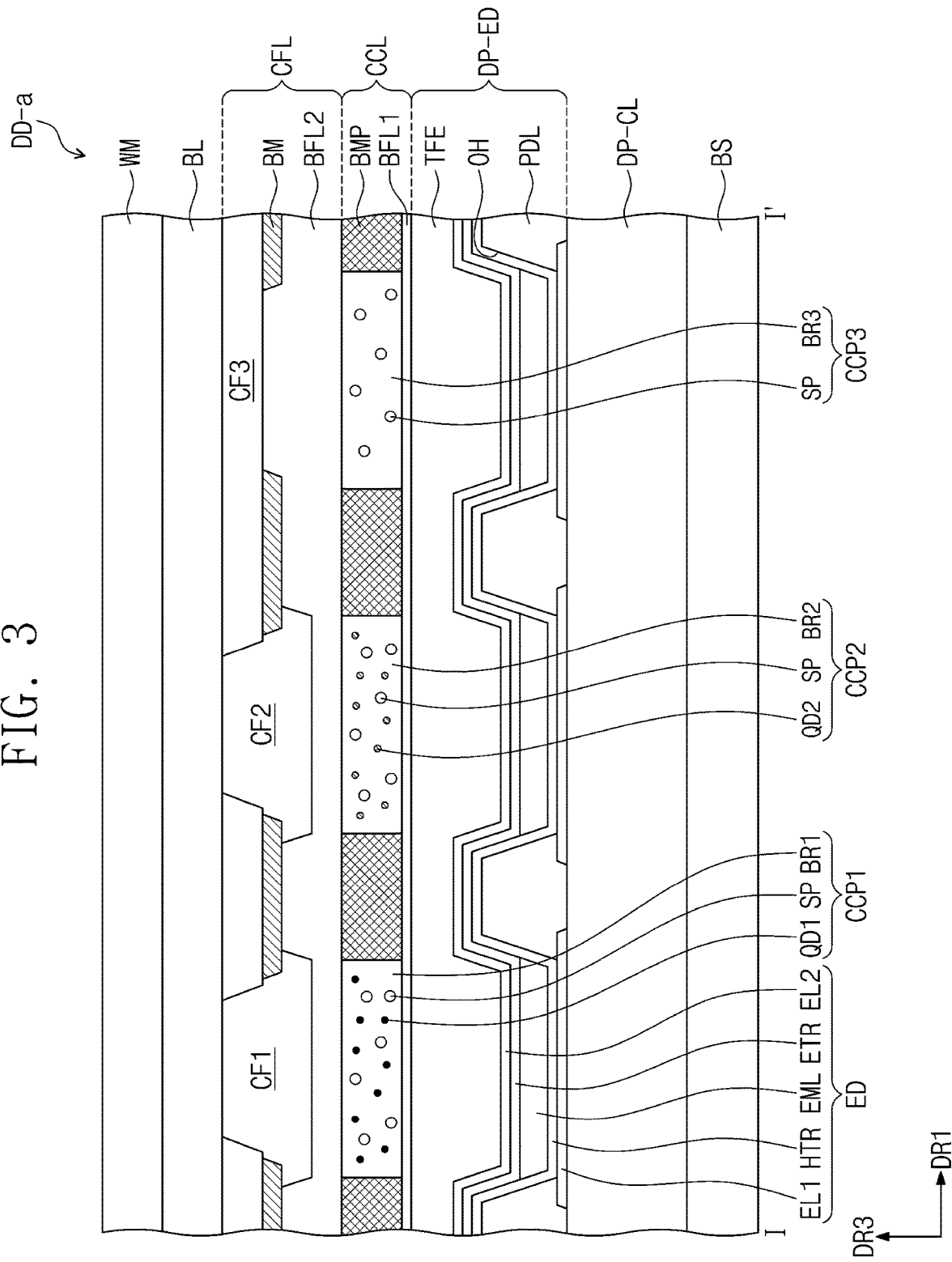
FIG. 3 is a cross-sectional view illustrating a display device according to one or more embodiments of the present disclosure.

FIG. 1 shows a display device according to one or more embodiments. FIG. 2 shows a cross-section of a part of the display device of FIG. 1 taken along line I-I'. FIG. 3 illustrates a display device according to one or more embodiments of the present disclosure.

In FIG. 1, a mobile electronic device is illustrated as an example of the display device DD. However, the display device DD may be used in large-size electronic devices such as a television, a monitor and/or an external billboard, as well as in small and medium-size electronic devices such as a personal computer, a laptop computer, a personal digital terminal, a car navigation unit, a game console, a smart phone, a tablet and/or a camera. In addition, the aforementioned electronic devices are suggested as only embodiments, and the display device may be employed in other electronic devices unless deviated from the present disclosure.

Referring to FIG. 1, the display device DD may display images IM through a display surface IS. The display surface IS includes a display area DA displaying the images IM, and a non-display area NDA which is adjacent to the display area DA. The non-display area NDA is an area in which images are not displayed.

The display area DA may have a tetragonal shape. The non-display area NDA may surround the display area DA.

However, the embodiments of the present disclosure are not limited thereto, and the shape of the display area DA and the shape of the non-display area NDA may be relatively suitably designed. In one or more embodiments, the non-display area NDA may not be present on a front surface of the display device DD.

Display devices DD and DD-a of one or more embodiments may include a substrate BS, a display element layer DP-ED disposed on the substrate BS, and a protective layer WM disposed on the display element layer DP-ED. According to one or more embodiments, at least one of the substrate BS, the display element layer DP-ED, and the protective layer WM may contain a light absorber of one or more embodiments.

In the description, the term "substituted or unsubstituted" may refer to a functional group or substituent that is unsubstituted or that is substituted with at least one substituent selected from the group consisting of a deuterium atom, a halogen atom, a cyano group, a nitro group, an amino group, a silyl group, an oxy group, a thio group, a sulfinyl group, a sulfonyl group, a carbonyl group, a boron group, a phosphine oxide group, a phosphine sulfide group, an alkyl group, an alkenyl group, an alkynyl group, an alkoxy group, a hydrocarbon ring group, an aryl group, and a heterocyclic group. In addition, each of the substituents exemplified above may itself be substituted or unsubstituted. For example, a biphenyl group may be interpreted as an aryl group or a phenyl group substituted with a phenyl group.

In the description, examples of the halogen atom may include a fluorine atom, a chlorine atom, a bromine atom, and an iodine atom.

In the description, the alkyl group may be a linear, branched or cyclic alkyl group. The number of carbons in the alkyl group may be 1 to 50, 1 to 30, 1 to 20, 1 to 10, or 1 to 6. Examples of the alkyl group may include a methyl group, an ethyl group, an n-propyl group, an isopropyl group, an n-butyl group, an s-butyl group, a t-butyl group, an i-butyl group, a 2-ethylbutyl group, a 3,3-dimethylbutyl group, an n-pentyl group, an i-pentyl group, a neopentyl group, a t-pentyl group, a cyclopentyl group, a 1-methylpentyl group, a 3-methylpentyl group, a 2-ethylpentyl group, a 4-methyl-2-pentyl group, an n-hexyl group, a 1-methylhexyl group, a 2-ethylhexyl group, a 2-butylhexyl group, a cyclohexyl group, a 4-methylcyclohexyl group, a 4-t-butyl-cyclohexyl group, an n-heptyl group, a 1-methylheptyl group, a 2,2-dimethylheptyl group, a 2-ethylheptyl group, a 2-butylheptyl group, an n-octyl group, a t-octyl group, a 2-ethyloctyl group, a 2-butyloctyl group, a 2-hexyloctyl group, a 3,7-dimethyloctyl group, a cyclooctyl group, an n-nonyl group, an n-decyl group, an adamantyl group, a 2-ethyldecyl group, a 2-butyldecyl group, a 2-hexyldecyl group, a 2-octyldecyl group, an n-undecyl group, an n-dodecyl group, a 2-ethyldodecyl group, a 2-butyldodecyl group, a 2-hexyldocecyl group, a 2-octyldodecyl group, an n-tridecyl group, an n-tetradecyl group, an n-pentadecyl group, an n-hexadecyl group, a 2-ethylhexadecyl group, a 2-butylhexadecyl group, a 2-hexylhexadecyl group, a 2-octylhexadecyl group, an n-heptadecyl group, an n-octadecyl group, an n-nonadecyl group, an n-eicosyl group, a 2-ethyleicosyl group, a 2-butyleicosyl group, a 2-hexyleicosyl group, a 2-octyleicosyl group, an n-henicosyl group, an n-docosyl group, an n-tricosyl group, an n-tetracosyl group, an n-pentacosyl group, an n-hexacosyl group, an n-heptacosyl group, an n-octacosyl group, an n-nonacosyl group, an n-triacontyl group, etc., but the embodiments of the present disclosure are not limited thereto.

The aryl group herein means any functional group or substituent derived from an aromatic hydrocarbon ring. The aryl group may be a monocyclic aryl group or a polycyclic aryl group. The number of ring-forming carbon atoms in the aryl group may be 6 to 30, 6 to 20, or 6 to 15. Examples of the aryl group may include a phenyl group, a naphthyl group, a fluorenyl group, an anthracenyl group, a phenanthryl group, a biphenyl group, a terphenyl group, a quaterphenyl group, a quinquephenyl group, a sexiphenyl group, a triphenylenyl group, a pyrenyl group, a benzofluoranthenyl group, a chrysenyl group, etc., but the embodiments of the present disclosure are not limited thereto.

A heteroaryl group herein may include at least one of B, O, N, P, Si, or S as a ring-forming heteroatom. When the heteroaryl group contains two or more heteroatoms, the two or more heteroatoms may be the same as or different from each other. The heteroaryl group may be a monocyclic heteroaryl group or polycyclic heteroaryl group. The number of ring-forming carbon atoms in the heteroaryl group may be 2 to 30, 2 to 20, or 2 to 10. Examples of the heteroaryl group may include a thiophene group, a furan group, a pyrrole group, an imidazole group, a triazole group, a pyridine group, a bipyridine group, a pyrimidine group, a triazine group, a triazole group, an acridyl group, a pyridazine group, a pyrazinyl group, a quinoline group, a quinazoline group, a quinoxaline group, a phenoxazine group, a phthalazine group, a pyrido pyrimidine group, a pyrido pyrazine group, a pyrazino pyrazine group, an isoquinoline group, an indole group, a carbazole group, an N-arylcarbazole group, an N-heteroarylcarbazole group, an N-alkylcarbazole group, a benzoxazole group, a benzoimidazole group, a benzothiazole group, a benzocarbazole group, a benzothiophene group, a dibenzothiophene group, a thienothiophene group, a benzofuran group, a phenanthroline group, a thiazole group, an isoxazole group, an oxazole group, an oxadiazolyl group, a thiadiazole group, a phenothiazine group, a dibenzosilole group, a dibenzofuran group, etc., but the embodiments of the present disclosure are not limited thereto.

In the description, the above description with respect to the aryl group may be applied to an arylene group except that the arylene group is a divalent group. The above description with respect to the heteroaryl group may be applied to a heteroarylene group except that the heteroarylene group is a divalent group.

Meanwhile, in the description, "$\text{-}\underset{\xi}{\xi}$" refers to a position to be connected (e.g., a binding site).

According to one or more embodiments, at least one of the substrate BS, the display element layer DP-ED, or the protective layer WM may contain a light absorber represented by Formula 1 below:

Formula 1

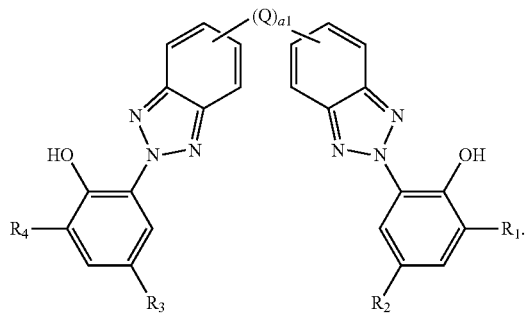

In Formula 1, a1 may be an integer of 1 to 10. When a1 is an integer of 2 or more, a plurality of Q's may all be the same or at least one may be different from the others. For example, when a1 is 3, three Q's may all be the same. When a1 is 3, two Q's may be the same, and one Q may be different from the two Q's. In some embodiments, when a1 is 3, three Q's may be different from one another. However, these are only illustrations, and the embodiments of the present disclosure are not limited thereto.

Q may be a substituted or unsubstituted arylene group having 6 to 30 ring-forming carbon atoms, or a substituted or unsubstituted heteroarylene group having 2 to 30 ring-forming carbon atoms. For example, Q may be a substituted or unsubstituted arylene group having 10 or more ring-forming carbon atoms, and/or a condensed polycyclic group. In one or more embodiments, Q may be a heteroarylene group including at least one of a nitrogen atom or a sulfur atom.

$R_1$ to $R_4$ may be each independently a hydrogen atom, a deuterium atom, a halogen atom, a substituted or unsubstituted alkyl group having 1 to 20 carbon atoms, a substituted or unsubstituted aryl group having 6 to 30 ring-forming carbon atoms, or a substituted or unsubstituted heteroaryl group having 2 to 30 ring-forming carbon atoms.

According to one or more embodiments, the light absorber represented by Formula 1 may be bilaterally symmetrical with respect to Q. $R_1$ and $R_4$ may be the same, and $R_2$ and $R_3$ may be the same. For example, $R_1$ to $R_4$ may all be the same. $R_1$ to $R_4$ may all be the same as a t-butyl group or a phenyl group. However, these are only illustrations, and the embodiments of the present disclosure are not limited thereto.

According to one or more embodiments, Q may be represented by any one among formulae Q1 to Q9 below:

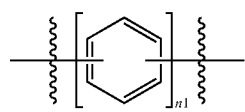

Q1

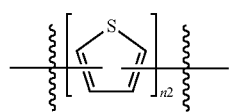

Q2

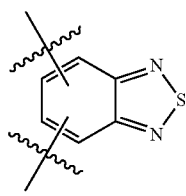

Q3

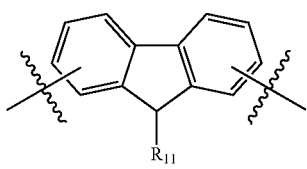

Q4

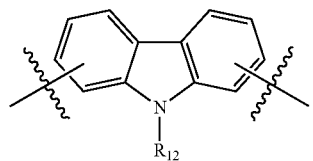

Q5

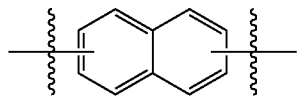

Q6

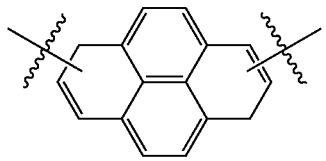

Q7

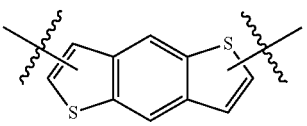

Q8

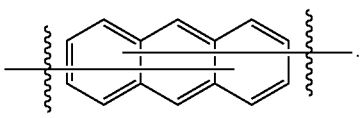

Q9

In Q1, n1 may be an integer of 1 to 10. In Q2, n2 may be an integer of 1 to 10. In Q4 and Q5, $R_{11}$ and $R_{12}$ may each independently be a substituted or unsubstituted alkyl group having 1 to 10 carbon atoms, and $R_{11}$ and $R_{12}$ each may be a linear alkyl group. For example, $R_{11}$ and $R_{12}$ each may be a methyl group or an ethyl group. However, these are only illustrations, and the embodiments of the present disclosure are not limited thereto.

For example, in Formula 1, when a1 is 2, each of two Q's may be different. When a1 is 2, two Q's are expressed as Q1 and Q2 respectively, and Q1 and Q2 may be directly bonded. When two Q's are expressed as Q1 and Q2 respectively, n1 and n2 may be each independently an integer of 1 to 10.

$R_1$ to $R_4$ may be each independently represented by any one among formulae R-1 to R-4 below:

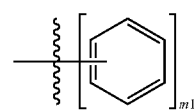

R-1

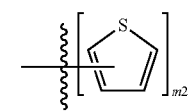

R-2

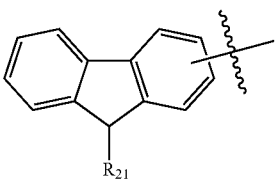

R-3

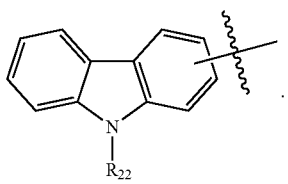

R-4

In R-1, m1 may be an integer of 1 to 10. In R-2, m2 may be an integer of 1 to 10. In R-3, $R_{21}$ may be a substituted or unsubstituted alkyl group having 1 to 10 carbon atoms. In R-4, $R_{22}$ may be a substituted or unsubstituted alkyl group having 1 to 10 carbon atoms. $R_{21}$ and $R_{22}$ each may be a linear alkyl group. For example, $R_{21}$ and $R_{22}$ may be each independently a methyl group or an ethyl group. However, these are only illustrations, and the embodiments of the present disclosure are not limited thereto.

According to one or more embodiments, the light absorber represented by Formula 1 may be represented by Light absorber 1 or Light absorber 2 below:

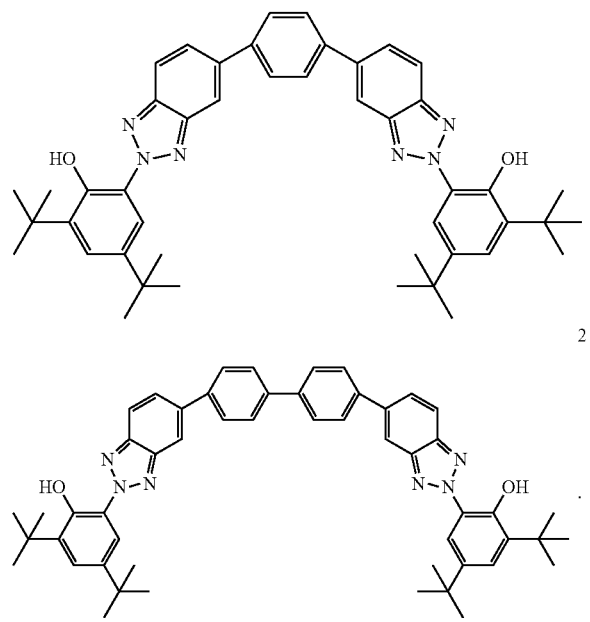

The light absorber of one or more embodiments may absorb ultraviolet rays. The light absorber of one or more embodiments may absorb light in a wavelength range of about 315 nm to about 400 nm. The light absorber of one or more embodiments may have the maximum value of absorbance in the wavelength range of about 315 nm to about 400 nm. For example, the light absorber of one or more embodiments may have the maximum value of absorbance of about 0.25 to about 0.45 in the wavelength range of about 315 nm to about 400 nm. For example, the light absorber of one or more embodiments may have the maximum value of absorbance of about 0.30 to about 0.45 in the wavelength range of about 315 nm to about 400 nm.

The light in the wavelength range of about 315 nm to about 400 nm corresponds to ultraviolet rays included in sunlight, and when the display device absorbs light in the wavelength range of about 315 nm to about 400 nm, the display device may have a damage such as discoloration. The display device includes various organic materials, and may absorb the light in the wavelength range of about 315 nm to about 400 nm due to aromatic ring groups included in the organic materials. If the organic materials are exposed to the light in the wavelength range of about 315 nm to about 400 nm, the decomposition and/or deformation of the organic materials may occur, in which intermolecular bonding or intramolecular bonding is decomposed.

The display devices DD and DD-a according to one or more embodiments contain the light absorber of one or more embodiments, and the decomposition of the organic materials due to the light in the wavelength range of about 315 nm to about 400 nm may be prevented or reduced. Accordingly, in the display devices DD and DD-a of one or more embodiments, the damage such as discoloration may be prevented or reduced, and the reliability of the display devices DD and DD-a may be maintained.

Referring to FIG. 2, the display devices DD and DD-a of one or more embodiments may include a substrate BS, a display element layer DP-ED, and a protective layer WM. In one or more embodiments, the display devices DD and DD-a may include a circuit layer DP-CL disposed between the substrate BS and the display element layer DP-ED.

The substrate BS may be a member which provides a base surface on which the display element layer DP-ED is disposed. The substrate BS may be a glass substrate, a metal substrate, a plastic substrate, etc. However, the embodiments of the present disclosure are not limited thereto, and the substrate BS may be an inorganic layer, an organic layer, or a composite material layer.

The substrate BS may contain the light absorber of one or more embodiments as described above. When the substrate BS contains the light absorber of one or more embodiments, the substrate BS may have optically transparent characteristics. The substrate BS may have a transmittance of 85% or more in a wavelength range of about 400 nm to about 800 nm. In one or more embodiments, when the substrate BS contains the light absorber of one or more embodiments, the light absorber may be contained (e.g., included) in an amount of about 0.03 wt % to about 0.50 wt % (exclusive of the amount of 0.50 wt %) based on a total weight of the substrate BS. For example, when the substrate BS contains the light absorber of one or more embodiments, the light absorber may be contained (e.g., included) in an amount of about 0.06 wt % to about 0.50 wt % (exclusive of the amount of 0.50 wt %) based on the total weight of the substrate BS. When the substrate BS contains the light absorber of one or more embodiments, the light absorber may be contained (e.g., included) in an amount of about 0.03 wt % to about 0.20 wt % based on the total weight of the substrate BS. In one or more embodiments, when the substrate BS contains the light absorber of one or more embodiments, the light absorber may be contained in an amount of about 0.06 wt % to about 0.20 wt % based on the total weight of the substrate BS. Based on the total weight of the substrate, the substrate containing the light absorber of one or more embodiments in an amount of less than about 0.03 wt % may be damaged by the light in the wavelength range of about 315 nm to about 400 nm. In addition, based on the total weight of the substrate, the substrate containing the light absorber of one or more embodiments in an amount of 0.50 wt % or more may have decreased optical transparency.

In the display devices DD and DD-a of one or more embodiments, the circuit layer DP-CL may be disposed on the substrate BS. The circuit layer DP-CL may include a plurality of transistors. Each of the transistors may include a control electrode, an input electrode, and an output electrode. For example, the circuit layer DP-CL may include a switching transistor and a driving transistor in order to drive light emitting elements ED-1, ED-2, and ED-3 of the display element layer DP-ED.

The display element layer DP-ED may include the first to third light-emitting elements ED-1, ED-2, and ED-3. The first to third light-emitting elements ED-1, ED-2, and ED-3 each may include a first electrode EL1, a second electrode EL2, which face each other, and respective emission layers EML-R, EML-G, and EML-B disposed between the first electrode EL1 and the second electrode EL2. A hole transport region HTR may be disposed between the first electrode EL1 and the respective one of emission layers EML-R, EML-G, and EML-B, and an electron transport region ETR may be disposed between the respective one of the emission layers EML-R, EML-G, and EML-B and the second electrode EL2. The first to third light emitting elements ED-1, ED-2 and ED-3 each may include the first electrodes EL1, the hole transport region HTR, the respective one of the emission layers EML-R, EML-G, and EML-B, the electron transport region ETR and the second electrode EL2, which are stacked in order.

In one or more embodiments, the light emitting elements each may include a plurality of emission layers. The plurality of emission layers may be stacked one by one. A charge generation layer may be disposed between the plurality of emission layers. The charge generation layer may include a p-type charge generation layer and/or an n-type charge generation layer. For example, the light emitting element including the plurality of emission layers may emit white light. The light emitting element including the plurality of emission layers may be a light emitting element having a tandem structure.

In the display element layer DP-ED, a pixel defining film PDL may be defined. The pixel defining film PDL may be defined between the first to third light emitting elements ED-1, ED-2, and ED-3. For example, the pixel defining film PDL may be defined between the first electrodes EL1 included in the first to third light emitting elements ED-1, ED-2, and ED-3. The respective emission layers EML-R, EML-G, and EML-B may be disposed in an opening OH defined in the pixel defining film PDL.

As described above, the pixel defining film PDL may contain the light absorber of one or more embodiments. When the pixel defining film PDL contains the light absorber of one or more embodiments, the light absorber may be contained (e.g., included) in an amount of about 0.03 wt % to about 0.50 wt % (exclusive of the amount of 0.50 wt %) based on a total weight of the pixel defining film PDL. For example, when the pixel defining film PDL contains the light absorber of one or more embodiments, the light absorber may be contained (e.g., included) in an amount of about 0.06 wt % to about 0.50 wt % based on the total weight of the pixel defining film PDL. For example, when the pixel defining film PDL contains the light absorber of one or more embodiments, the light absorber may be contained (e.g., included) in an amount of about 0.03 wt % to about 0.20 wt % based on the total weight of the pixel defining film PDL. When the pixel defining film PDL contains the light absorber of one or more embodiments, the light absorber may be contained (e.g., included) in an amount of about 0.06 wt % to about 0.20 wt % based on a total weight of the pixel defining film PDL. Based on the total weight of the pixel defining film, the pixel defining film containing the light absorber of one or more embodiments in an amount of less than about 0.03 wt % may be damaged by the light in the wavelength range of about 315 nm to about 400 nm. Based on the total weight of the pixel defining film, the pixel defining film containing the light absorber of one or more embodiments in an amount of 0.50 wt % or more may have effect on decrease in optical transparency of the display device.

In one or more embodiments, the pixel defining film PDL may include a polyacrylate-based resin or a polyimide-based resin. However, these are only illustrations, and the kinds of materials contained in the pixel defining film PDL are not limited thereto. According to one or more embodiments, the display element layer DP-ED may further include an encapsulation layer TFE. The encapsulation layer TFE may be disposed on the first to third light emitting elements ED-1, ED-2, and ED-3, and may seal the first to third light emitting elements ED-1, ED-2, and ED-3. The encapsulation layer TFE may serve to protect the first to third light emitting elements ED-1, ED-2, and ED-3 from moisture/oxygen and/or foreign substances such as dust particles. The encapsulation layer TFE may include at least one inorganic layer and at least one organic layer. The encapsulation layer TFE may have an alternately stacked structure of organic layers and inorganic layers. For example, the encapsulation layer TFE may have a stacked structure of an inorganic layer, an organic layer, and an inorganic layer one by one.

The encapsulation layer TFE may contain the light absorber of one or more embodiments. The organic layer of the encapsulation layer TFE may contain the light absorber. When the encapsulation layer TFE contains the light absorber of one or more embodiments, the light absorber may be contained (e.g., included) in an amount of about 0.03 wt % to about 0.50 wt % (exclusive of the amount of 0.50 wt %) based on the total weight of the organic layer included in the encapsulation layer TFE. For example, when the encapsulation layer TFE contains the light absorber of one or more embodiments, the light absorber may be contained (e.g., included) in an amount of about 0.06 wt % to about 0.50 wt % (exclusive of the amount of 0.50 wt %) based on the total weight of the organic layer included in the encapsulation layer TFE. When the encapsulation layer TFE contains the light absorber of one or more embodiments, the light absorber may be contained (e.g., included) in an amount of about 0.03 wt % to about 0.20 wt % based on the total weight of the organic layer included in the encapsulation layer TFE. When the encapsulation layer TFE contains the light absorber of one or more embodiments, the light absorber of one or more embodiments may be contained in an amount of about 0.06 wt % to about 0.20 wt % based on the total weight of the organic layer included in the encapsulation layer TFE. Based on the total weight of the organic layer included in the encapsulation layer, the encapsulation layer containing the light absorber of one or more embodiments in an amount of less than about 0.03 wt % may be damaged by the light in the wavelength range of about 315 nm to about 400 nm. Based on the total weight of the organic layer included in the encapsulation layer, the encapsulation layer containing the light absorber of one or more embodiments in an amount of 0.50 wt % or more may have effect on decrease in optical transparency of the display device.

The protective layer WM may be disposed on the encapsulation layer TFE. The protective layer WM may be a protective film or a window. The protective layer WM may be optically transparent. The protective layer WM may have a transmittance of 85% or more in the wavelength range of about 400 nm to about 800 nm. For example, the protective layer WM may be formed of an imide-based resin. However, this is only an illustration, and the embodiments of the present disclosure are not limited thereto.

The protective layer WM may contain the light absorber of one or more embodiments. When the protective layer WM contains the light absorber of one or more embodiments, the light absorber may be contained (e.g., included) in an amount of about 0.03 wt % to about 0.50 wt % (exclusive of the amount of 0.50 wt %) based on the total weight of the protective layer WM. For example, when the protective layer WM contains the light absorber of one or more embodiments, the light absorber may be contained (e.g., included) in an amount of about 0.06 wt % to about 0.50 wt % (exclusive of the amount of 0.50 wt %) based on the total weight of the protective layer WM. When the protective layer WM contains the light absorber of one or more embodiments, the light absorber may be contained (e.g., included) in an amount of about 0.03 wt % to about 0.20 wt % based on the total weight of the protective layer WM. When the protective layer WM contains the light absorber of one or more embodiments, the light absorber may be contained (e.g., included) in an amount of about 0.06 wt % to about 0.20 wt % based on the total weight of the protective layer WM. Based on the total weight of the protective layer, the protective layer containing the light absorber of one or more embodiments in an amount of less than about 0.03 wt % may be damaged by the light in the wavelength range of about 315 nm to about 400 nm. In addition, based on the total weight of the protective layer, the protective layer containing the light absorber of one or more embodiments in an amount of about 0.50 wt % or more may have decreased optical transparency.

Referring to FIG. 2, an optical layer PP may be disposed between the display element layer DP-ED and the protective layer WM. The optical layer PP may be disposed on the display panel DP and may control reflected light in the display panel DP due to external light. The optical layer PP may include, for example, a polarization layer or a color filter layer. In one or more embodiments, the optical layer PP may be omitted from the display device DD of one or more embodiments.

FIG. 3 illustrates the display device DD-a in which a light control layer CCL and a color filter layer CFL are disposed between a display element layer DP-ED and a protective layer WM. The display device DD-a of one or more embodiments may include the light control layer CCL disposed on the display element layer DP-ED and the color filter layer CFL disposed on the light control layer CCL.

Referring to FIG. 3, the emission layer EML may be disposed in an opening OH defined in the pixel defining film PDL. The emission layer EML may emit blue light.

A light control layer CCL may be disposed on an encapsulation layer TFE. The light control layer CCL may include a light conversion body. The light conversion body may be a quantum dot, a phosphor, and/or the like. The light conversion body may emit provided light by converting the wavelength thereof. For example, the light control layer CCL may be a layer containing the quantum dot and/or a layer containing the phosphor.

The light control layer CCL may include a plurality of light control units CCP1, CCP2 and CCP3. The light control units CCP1, CCP2 and CCP3 may be spaced apart from each other in an extending direction of a first directional axis DR1.

Divided patterns BMP may be disposed between the light control units CCP1, CCP2 and CCP3 spaced apart from each other. However, the embodiments of the present disclosure are not limited thereto. FIG. 3 illustrates that the divided patterns BMP do not overlap the light control units CCP1, CCP2 and CCP3, but at least a portion of the edges of the light control units CCP1, CCP2 and CCP3 may overlap the divided patterns BMP.

The light control layer CCL may include a first light control unit CCP1 containing a first quantum dot QD1 which converts first color light provided from the light-emitting element ED into second color light, a second light control unit CCP2 containing a second quantum dot QD2 which converts the first color light into third color light, and a third light control unit CCP3 which transmits the first color light.

In one or more embodiments, the first light control unit CCP1 may provide red light that is the second color light, and the second light control unit CCP2 may provide green light that is the third color light. The third light control unit CCP3 may transmit blue light that is the first color light provided in the light-emitting element ED. For example, the first quantum dot QD1 may be a red quantum dot, and the second quantum dot QD2 may be a green quantum dot.

Quantum dots QD1 and QD2 are materials having a crystal structure with a size of several nanometers, composed of hundreds to thousands of atoms, and exhibit a quantum confinement effect by which an energy band gap increases due to a small size. When light having a wavelength with energy greater than that of a band gap is incident to (e.g., on) the quantum dots QD1 and QD2, the quantum dots QD1 and QD2 absorb the light and thus are excited, and then fall to a ground state while emitting light with a specific (or set) wavelength. The emitted light with the wavelength has a value corresponding to the band gap. When the quantum dots QD1 and QD2 are adjusted in size and composition, light emitting characteristics due to the quantum confinement effect may be controlled. The quantum dots QD1 and QD2 may be selected from among group II-VI compounds, group III-V compounds, group IV-VI compounds, group IV elements, group IV compounds, group I-III-VI compounds, and combinations thereof. In the case where the quantum dots QD1 and QD2 are binary compounds, ternary compounds and/or quaternary compounds, they may be present in a particle with a uniform concentration distribution, or may be present in the same particle with a partially different concentration distribution. In one or more embodiments, the quantum dots QD1 and QD2 may have a core/shell structure in which one quantum dot surrounds another quantum dot. An interface between the core and the shell may have a concentration gradient in which the concentration of an element present in the shell becomes lower toward the center.

The light control layer CCL may further include a scatterer SP. The first light control unit CCP1 may include the first quantum dot QD1 and the scatterer SP, the second light control unit CCP2 may include the second quantum dot QD2 and the scatterer SP, and the third light control unit CCP3 may not include any quantum dot but may include the scatterer SP.

The scatterer SP may be inorganic particles. For example, the scatterer SP may include at least one of $TiO_2$, ZnO, $Al_2O_3$, $SiO_2$, or hollow silica. The scatterer SP may include any one of $TiO_2$, ZnO, $Al_2O_3$, $SiO_2$, or hollow silica, or may be a mixture of at least two materials selected from among $TiO_2$, ZnO, $Al_2O_3$, $SiO_2$, and hollow silica.

The first light control unit CCP1, the second light control unit CCP2, and the third light control unit CCP3 each may include base resins BR1, BR2, and BR3 in which the quantum dots QD1 and QD2 and the scatterer SP are dispersed. In one or more embodiments, the first light control unit CCP1 may include the first quantum dot QD1 and the scatterer SP dispersed in the first base resin BR1, the second light control unit CCP2 may include the second quantum dot QD2 and the scatterer SP dispersed in the second base resin BR2, and the third light control unit CCP3 may include the scatterer SP dispersed in the third base resin BR3. The base resins BR1, BR2, and BR3 are media in which the quantum dots QD1 and QD2 and the scatterer SP are dispersed, and may be formed of various suitable resin compositions, which may be generally referred to as a binder. For example, the base resins BR1, BR2, and BR3 may be acrylic-based resins, urethane-based resins, silicone-based resins, epoxy-based resins, etc. The base resins BR1, BR2, and BR3 may be transparent resins. In one or more embodiments, the first base resin BR1, the second base resin BR2, and the third base resin BR3 may be the same as or different from each other.

The light control layer CCL may include a barrier layer BFL1. The barrier layer BFL1 may serve to prevent or reduce the penetration of moisture and/or oxygen (hereinafter, referred to as 'moisture/oxygen'). The barrier layer BFL1 may block or reduce the exposure of the light control units CCP1, CCP2 and CCP3 to moisture/oxygen. The barrier layer BFL1 may be disposed between the light control units CCP1, CCP2 and CCP3 and the encapsulation layer TFE. The barrier layer BFL1 may cover the light control units CCP1, CCP2, and CCP3. In one or more embodiments, the barrier layer BFL1 may be provided between the color filter layer CFL and the light control units CCP1, CCP2, and CCP3.

The barrier layers BFL1 and BFL2 may include at least one inorganic layer. For example, the barrier layers BFL1 and BFL2 may include an inorganic material. For example, the barrier layers BFL1 and BFL2 may include silicon nitride, aluminum nitride, zirconium nitride, titanium nitride, hafnium nitride, tantalum nitride, silicon oxide, aluminum oxide, titanium oxide, tin oxide, cerium oxide, silicon oxynitride, a metal thin film which secures a transmittance, etc. In one or more embodiments, the barrier layers BFL1 and BFL2 may further include an organic film. The barrier layers BFL1 and BFL2 may be formed of a single layer or a plurality of layers.

In the display device DD of one or more embodiments, the color filter layer CFL may be disposed on the light control layer CCL. For example, the color filter layer CFL may be directly disposed on the light control layer CCL. In this case, the barrier layer BFL2 may be omitted.

The color filter layer CFL may include a light shielding unit BM and color filters CF1, CF2, and CF3. The color filter layer CFL may include a first filter CF1 configured to transmit the second color light, a second filter CF2 configured to transmit the third color light, and a third filter CF3 configured to transmit the first color light. For example, the first filter CF1 may be a red filter, the second filter CF2 may be a green filter, and the third filter CF3 may be a blue filter. The filters CF1, CF2, and CF3 each may include a polymeric photosensitive resin and a pigment and/or dye. The first filter CF1 may include a red pigment and/or dye, the second filter CF2 may include a green pigment and/or dye, and the third filter CF3 may include a blue pigment and/or dye. However, the embodiments of the present disclosure are not limited thereto, the third filter CF3 may not include a pigment or a dye. The third filter CF3 may include a polymeric photosensitive resin and may not include a pigment or a dye. The third filter CF3 may be transparent. The third filter CF3 may be formed of a transparent photosensitive resin.

Furthermore, in one or more embodiments, the first filter CF1 and the second filter CF2 may be a yellow filter. The first filter CF1 and the second filter CF2 may not be separated, but may be provided as one filter.

The light shielding unit BM may be a black matrix. The light shielding unit BM may include an organic light shielding material or an inorganic light shielding material containing a black pigment and/or dye. The light shielding unit BM may prevent or reduce light leakage, and may separate boundaries between the adjacent filters CF1, CF2, and CF3.

In one or more embodiments, the light shielding unit BM may be formed of a blue filter.

A sub-substrate BL may be disposed on the color filter layer CFL. The sub-substrate BL may be a member configured to provide a base surface on which the color filter layer CFL, the light control layer CCL, and the like are disposed. The sub-substrate BL may be a glass substrate, a metal substrate, a plastic substrate, etc. However, the embodiments of the present disclosure are not limited thereto, and the sub-substrate BL may be an inorganic layer, an organic layer, or a composite material layer. In one or more embodiments, the sub-substrate BL may be omitted.

The sub-substrate BL may contain the light absorber of one or more embodiments. When the sub-substrate BL contains the light absorber of one or more embodiments, the sub-substrate BL may be optically transparent. For example, when the sub-substrate BL contains the light absorber of one or more embodiments, the sub-substrate BL may have a transmittance of 85% or more in the wavelength range of about 400 nm to about 800 nm.

When the sub-substrate BL contains the light absorber of one or more embodiments, the light may be contained (e.g., included) in an amount of about 0.03 wt % to about 0.50 wt % (exclusive of the amount of 0.50 wt %) based on a total weight of the sub-substrate BL. For example, when the sub-substrate BL contains the light absorber of one or more embodiments, the light absorber may be contained (e.g., included) in an amount of about 0.06 wt % to about 0.50 wt % (exclusive of the amount of 0.50 wt %) based on the total weight of the sub-substrate BL. When the sub-substrate BL contains the light absorber of one or more embodiments, the light absorber may be contained (e.g., included) in an amount of about 0.03 wt % to about 0.20 wt % based on the total weight of the sub-substrate BL. When the sub-substrate BL contains the light absorber of one or more embodiments, the light absorber may be contained in an amount of about 0.03 wt % to about 0.50 wt % based on the total weight of the sub-substrate BL. When the sub-substrate contains the light absorber of one or more embodiments in an amount of less than about 0.03 wt % based on the total weight of the sub-substrate, the sub-substrate may be damaged by the light in the wavelength range of about 315 nm to about 400 nm. When the sub-substrate contains the light absorber of one or more embodiments in an amount of 0.50 wt % or more based on the total weight of the sub-substrate, the optical transparency of the sub-substrate may decrease.

The substrate of one or more embodiments may contain the light absorber of one or more embodiments in at least one of the substrate, the display element layer, or the protective layer. The light absorber of one or more embodiments may absorb light in the wavelength range of about 315 nm to about 400 nm, thereby preventing or reducing the damage to the display device of one or more embodiments. Accordingly, the reliability of the display device of one or more embodiments may be improved.

Figure 4:
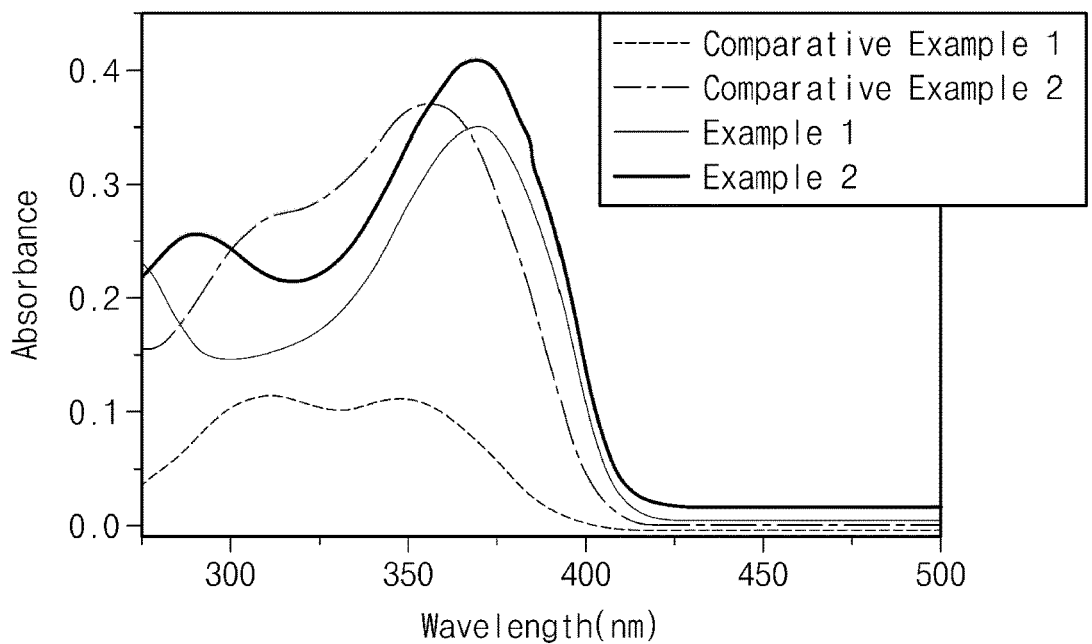
FIG. 4 is a graph showing absorbance according to wavelength.

FIG. 4 is a graph showing absorbance according to wavelength. Comparative Example 1, Comparative Example 2, Example 1, and Example 2 each represent the evaluation result of absorbance according to wavelength of Comparative Example Compound 1, Comparative Example Compound 2, Compound 1, and Compound 2. In Example 1 and Example 2, the absorbance of the light absorbers of one or more embodiments was evaluated. Compound 1 and Compound 2 each are the light absorber of one or more embodiments. Compounds used in Comparative Example 1, Comparative Example 2, Example 1, and Example 2 are shown in Table 1 below:

TABLE 1
Compound 1
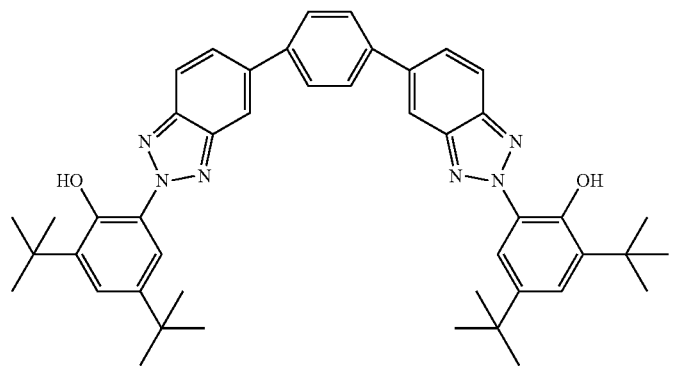 [SMILES: CC(C)(C)c1cc(-n2nc3ccc(-c4ccc(-c5ccc6nn(-c7cc(C(C)(C)C)cc(C(C)(C)C)c7O)nc6c5)cc4)cc3n2)c(O)c(C(C)(C)C)c1]
Compound 2
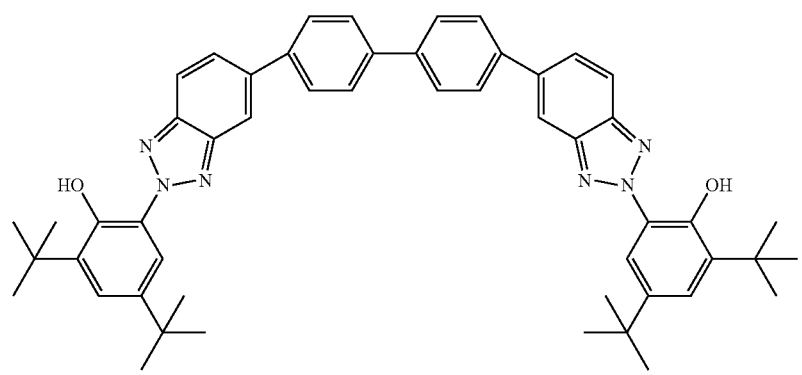 [SMILES: CC(C)(C)c1cc(-n2nc3ccc(-c4ccc(-c5ccc(-c6ccc7nn(-c8cc(C(C)(C)C)cc(C(C)(C)C)c8O)nc7c6)cc5)cc4)cc3n2)c(O)c(C(C)(C)C)c1]
Comparative Example Compound 1
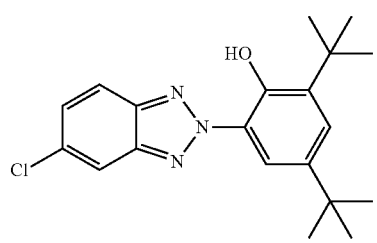
2-(3,5-Di-tert-butyl-2-hydroxyphenyl)-
5-chlorobenzotriazole
Comparative Example Compound 2
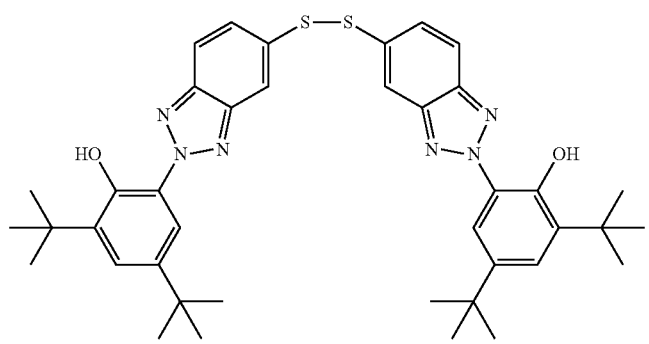 [SMILES: CC(C)(C)c1cc(-n2nc3ccc(SSc4ccc5nn(-c6cc(C(C)(C)C)cc(C(C)(C)C)c6O)nc5c4)cc3n2)c(O)c(C(C)(C)C)c1]

Synthesis of Compound

Comparative Example Compound 1 was purchased and used from Tokyo Chemical Industry Co., Ltd. Comparative Example Compound 2 was synthesized with reference to the documents (Xu S, Cao D, Chen M. *Synthesis and characterization of a bisbenzotriazole derivative and its application in PVC as an ultraviolet absorber*, J Vinyl Addit Technol 2007; 13(4):195-200, and Kim, S.; Hwang, T. G.; Namgoong, J. W.; Kim, H. M.; Kim, J. P., *Effect of Linker Moiety on Linear Dimeric Benzotriazole Derivatives as Highly Stable Uv Absorber for Transparent Polyimide Film*, Dyes and Pigments 2020, 180, 108469—the entire content of each of which is hereby incorporated by reference). Compounds 1 and 2 of Examples were synthesized by the following method, but the synthetic method of the light absorber according to one or more embodiments of the present disclosure is not limited thereto.

1. Synthesis of Compound 1

A magnet, dimethylformamide (20 mL), Comparative Example Compound 1 (6.01 g, 13.52 mmol), and Pd(PPh$_3$)$_4$ (1.29 g, 0.00112 mol) were added in a 100 mL three-neck flask, and the mixture was stirred for about one hour at room temperature, and was bubbled with a nitrogen gas. 1,4-benzenediboronic acid (0.92 g, 0.0056 mol) and K$_2$CO$_3$ (6.96 g, 0.0504 mol) were slowly added portion-wise in the flask. The reactant (e.g., the resulting reaction mixture) was stirred in a nitrogen atmosphere for about 24 hours at about 140° C. The reactant (e.g., the resulting reaction mixture) was cooled to room temperature and then an organic layer was separated by using a CH$_2$Cl$_2$ solvent and distilled water. The separated organic layer was passed through MgSO$_4$ and remaining moisture was removed, and the solvent was removed by a rotary evaporator and dried. Then, the resultant product was purified by column chromatography (CH$_2$Cl$_2$/Petroleum ether 1:3, v/v) to obtain Compound 1 (0.4 g, yield: 10%). The NMR analysis result of the obtained Compound 1 is as follows.

TABLE 2

| Compound 1 | NMR Result |
|---|---|
| $^1$H NMR (CD$_2$Cl$_2$, 500 MHz) | δ (ppm): 11.69 (s, 2H), 8.25 (d, J = 2.5 Hz, 2H), 8.14 (d, J = 1 Hz, 2H), 7.99 (d, J = 8.5 Hz, 2H), 7.81 (s, 4H), 7.79 (d, J = 7.0 Hz, 2H), 7.39 (d, J = 2.5 Hz, 2H), 1.45 (s, 18H), 1.33 (s, 18H). |
| $^{13}$C NMR (CD$_2$Cl$_2$, 125 MHz) | δ (ppm): 147.25, 143.91, 142.79, 142.38, 141.17, 140.90, 140.85, 139.93, 139.13, 129.44, 128.67, 128.38, 128.15, 128.11, 127.52, 125.79, 118.36, 116.67, 115.21, 36.17, 35.05, 31.78, 29.87. |

2. Synthesis of Compound 2

Compound 2 was synthesized in substantially the same manner as the synthesis of Compound 1, except that 4,4'-biphenyldiboronic acid in the same mole amount as 1,4-benzenediboronic acid was used instead of 1,4-benzenediboronic acid. The NMR analysis result of the obtained Compound 2 is as follows.

TABLE 3

| Compound 2 | NMR Result |
|---|---|
| $^1$H NMR (C$_6$D$_5$CD$_3$, 500 MHz) | δ (ppm): 12.18 (s, 2H), 8.65 (d, J = 2 Hz, 2H), 7.68 (d, J = 9 Hz, 2H), 7.64-7.65 (m, 2H), 7.63 (s, 4H), 7.60 (d, J = 2.5 Hz, 2H), 7.58 (s, 4H), 7.47-7.49 (d, J = 7.5 Hz, 2H), 1.71 (s, 18H), 1.38 (s, 18H). |
| $^{13}$C NMR (CD$_2$Cl$_2$, 125 MHz) | δ (ppm): 147.29, 143.82, 142.93, 142.44, 140.76, 139.19, 134.42, 134.30, 134.15, 129.75, 129.44, 129.41, 129.31, 129.26, 129.06, 129.00, 128.85, 128,67, 128.45, 128.40, 128.15, 128.06, 128.02, 127.88, 127.83, 127.52, 127.48, 125.93, 125.87, 125.76, 118.63, 118.39, 116.71, 116.19, 115.22, 36.18, 35.05, 31.77, 31.72, 31.60, 30.17, 29.87, 29.83. |

The compound of Comparative Example 1 has an extinction coefficient of 11,000 $M^{-1}$ $cm^{-1}$, and the compound of Comparative Example 2 has an extinction coefficient of 37,000 $M^{-1}$ $cm^{-1}$. The compound of Example 1 has an extinction coefficient of 35,000 $M^{-1}$ $cm^{-1}$, and the compound of Comparative Example 2 has an extinction coefficient of 40,000 $M^{-1}$ $cm^{-1}$. Referring to the graph of FIG. 4, it may be seen that the compounds of Comparative Examples and Examples have a main absorption wavelength of about 300 nm to about 400 nm. It may be seen that compounds of Comparative Example 2, Example 1 and Example 2 have the maximum value of absorbance in the wavelength range of about 350 nm to about 400 nm. Comparative Example Compound 1 of Comparative Example 1 shows the maximum absorbance at about 347 nm, and Comparative Example Compound 2 of Comparative Example 2 shows the maximum absorbance at about 357 nm. Compound 1 of Example 1 shows the maximum absorbance at about 370 nm, and Compound 2 of Example 2 shows the maximum absorbance at about 369 nm. The extinction coefficients of the compounds of Comparative Examples and Examples are analyzed in an N-methyl-2-pyrrolidone (NMP) solvent.

Referring to FIG. 4, it may be seen that the compounds of Examples have longer wavelength showing the maximum absorbance compared to the compounds of Comparative Examples. Without being bound by any particular theory, it is believed that the compounds of Examples include a phenyl group or a biphenyl group bound to carbon atoms of, and positioned between, two benzotriazoles, thereby having longer wavelength showing the maximum absorbance due to conjugation effects in a molecule, as compared to the compounds of Comparative Examples.

Figure 5:
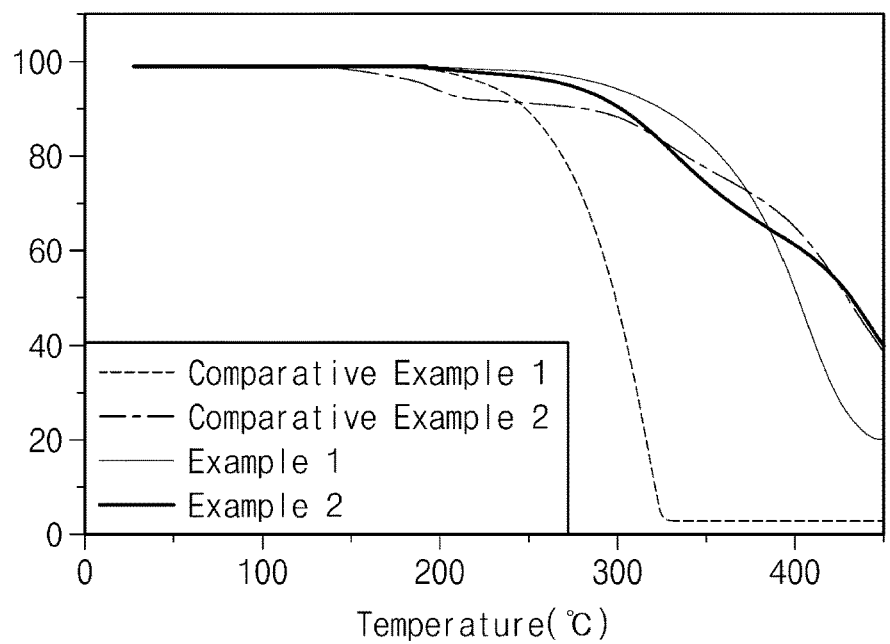
FIG. 5 is a graph showing mass change according to temperature.

FIG. 5 is a graph showing mass change according to temperature. With respect to the compounds of Comparative Examples and Examples, the mass change according to temperature was evaluated. When the mass is 100%, the mass of the compound is not lost, and when the mass is 0%, the compound is completely lost. Referring to FIG. 5, it may be seen that in the compounds of Comparative Examples, the mass-loss of the compounds starts at a lower temperature than in the compounds of Examples. That is, it may be seen that the compounds of Comparative Examples have a lower starting temperature of the mass-loss than the compounds of Examples. Comparative Example Compound 1 of Comparative Example 1, Compound 1 of Example 1, and Compound 2 of Example 2 have a higher starting temperature of the mass-loss than that of Comparative Example Compound 2 of Comparative Example 2. Without being bound by any particular theory, it is thought that the compounds of Examples include a linker represented by Q in Formula 1, thereby improving heat resistance compared to the compounds of Comparative Examples.

In addition, it may be seen that in the compound of Comparative Example 1, the mass of the compound is close to 0% at a temperature between about 300° C. and about 350° C., while in Comparative Example Compound 2 of Comparative Example 2, Compound 1 of Example 1, and Compound 2 of Example 2, the mass of about 10% to about 20% for each of these compounds is not lost and remains at a temperature of about 400° C. or more. It may be seen that the compounds of Examples have less amount of the mass-loss even at a high temperature, compared to the compound of Comparative Example 1.

Figure 6A:
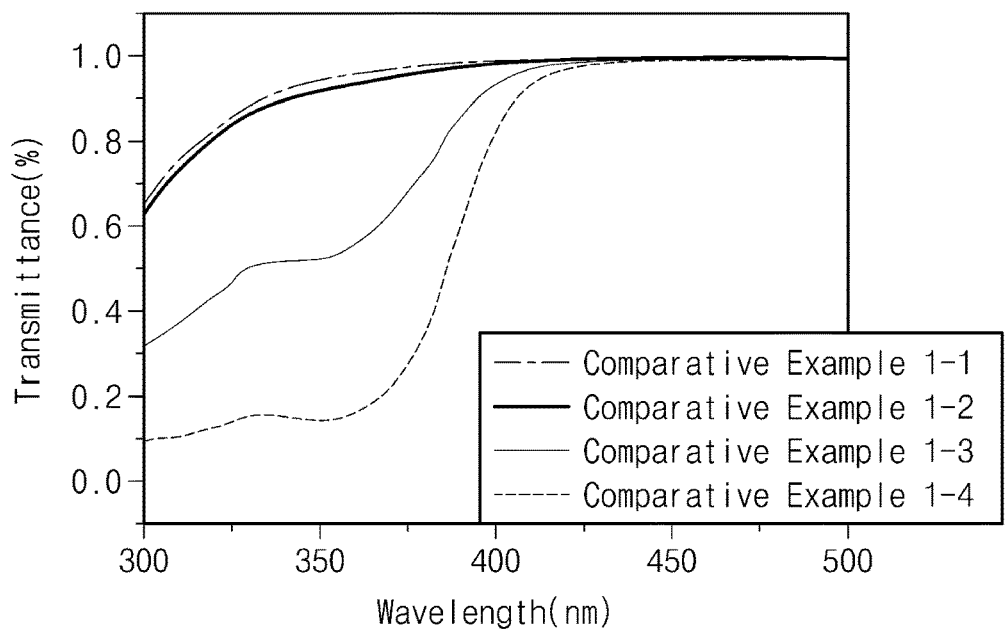
FIG. 6A is a graph showing transmittance according to wavelength.
Figure 6B:
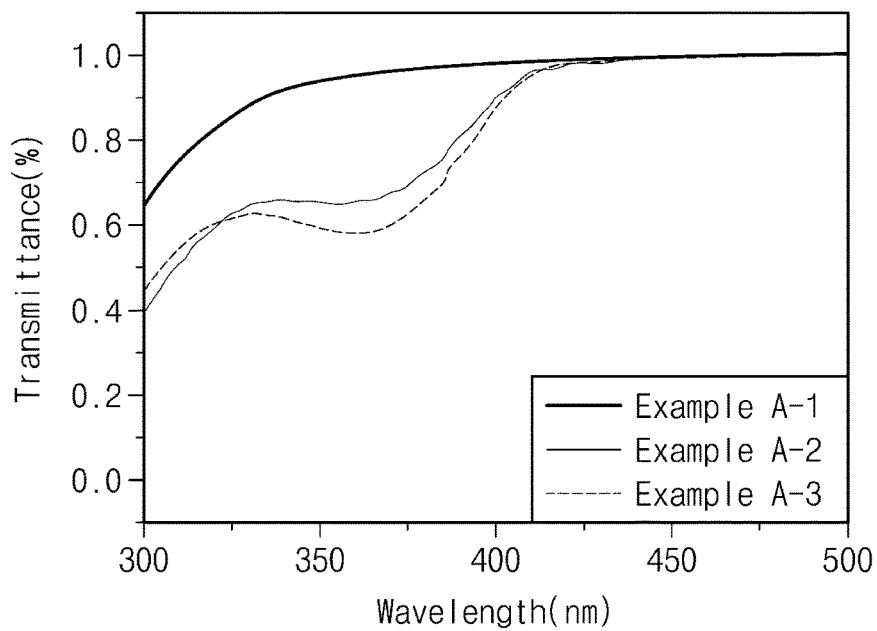
FIG. 6B is a graph showing transmittance according to wavelength.
Figure 6C:
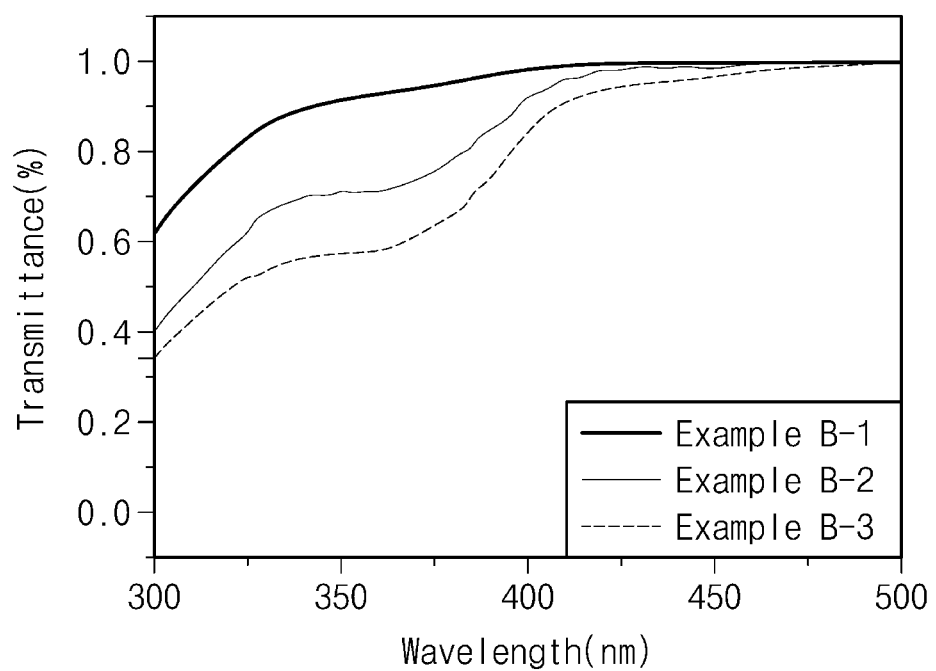
FIG. 6C is a graph showing transmittance according to wavelength.

Each of FIGS. 6A to 6C is a graph showing transmittance according to wavelength. The graphs of FIGS. 6A to 6C show normalized transmittance. A transmittance according to wavelength in the protective layer containing the light absorber of each of Comparative Examples and Examples is evaluated. The protective layer is formed of a polyimide resin, and the transmittance is evaluated by varying the content of the light absorber in the protective layers of Comparative Examples and Examples. FIGS. 6A to 6C show that as the transmittance with respect to light decreases, a display quality of the display device decreases. That is, it is shown that as the transmittance with respect to light of the protective layer (e.g., the transmittance of the protective layer) decreases, the display quality of the display device decreases.

The protective layers of Comparative Examples 1-1 to 1-4 in FIG. 6A include Comparative Example Compound 1. The protective layer of Comparative Example 1-1 contains about 0.03 wt % of Comparative Example Compound 1 based on the total weight of the protective layer. The protective layer of Comparative Example 1-2 contains about 0.06 wt % of Comparative Example Compound 1 based on the total weight of the protective layer. The protective layer of Comparative Example 1-3 contains about 0.50 wt % of Comparative Example Compound 1 based on the total weight of the protective layer. The protective layer of Comparative Example 1-4 contains about 1.60 wt % of Comparative Example Compound 1 based on the total weight of the protective layer.

The protective layers of Examples A-1 to A-3 in FIG. 6B include Compound 1. The protective layer of Example A-1 contains about 0.06 wt % of Compound 1 based on the total weight of the protective layer. The protective layer of Example A-2 contains about 0.50 wt % of Compound 1 based on the total weight of the protective layer. The protective layer of Example A-3 contains about 1.60 wt % of Compound 1 based on the total weight of the protective layer.

The protective layers of Examples B-1 to B-3 in FIG. 6C include Compound 2. The protective layer of Example B-1 contains about 0.06 wt % of Compound 2 based on the total weight of the protective layer. The protective layer of Example B-2 contains about 0.50 wt % of Compound 2 based on the total weight of the protective layer. The protective layer of Example B-3 contains about 1.60 wt % of Compound 2 based on the total weight of the protective layer.

Referring to FIGS. 6A to 6C, it may be seen that as the weight of the compounds contained in the protective layer increases, the transmittance of light decreases. It may be seen that in the protective layers of Examples A-1 to A-3 and the protective layers of Examples B-1 to B-3, the reduction amount of the transmittance in the wavelength range of about 300 nm to about 400 nm is less than that of the protective layers of Comparative Examples. That is, it may be seen that in the protective layer including Compound 1 and the protective layer including Compound 2, the absorbance of light in the wavelength range of about 300 nm to about 400 nm is greater than that of the protective layers of Comparative Examples.

Comparative Example 1-3 of FIG. 6A and Example A-2 of FIG. 6B have the same content, about 0.50 wt %, of the compound contained in the protective layer, and it may be seen that Example A-2 has a higher transmittance with respect to light in the wavelength range of about 400 nm or less compared to Comparative Example 1-3. In addition, Comparative Example 1-4 of FIG. 6A and Example A-3 of FIG. 6B have the same content, about 1.60 wt %, of the compound contained in the protective layer, and it may be seen that Example A-3 has a higher transmittance with respect to light in the wavelength range of about 400 nm or less compared to Comparative Example 1-4.

Comparative Example 1-3 of FIG. 6A and Example B-2 of FIG. 6C have the same content, about 0.50 wt %, of the compound contained in the protective layer, and it may be seen that Example B-2 has a higher transmittance with respect to light in the wavelength range of about 400 nm or less compared to Comparative Example 1-3. Comparative Example 1-4 of FIG. 6A and Example B-3 of FIG. 6C have the same content, about 1.60 wt %, of the compound contained in the protective layer, and it may be seen that Example B-3 has a higher transmittance with respect to light in the wavelength range of about 400 nm or less compared to Comparative Example 1-4.

It may be seen that the protective layers of Examples contain the light absorber of one or more embodiments, thereby exhibiting an improved transmittance compared to the protective layers of Comparative Examples. Therefore, the display device containing the light absorber of one or more embodiments may exhibit an improved display quality.

The display device of one or more embodiments may include the substrate, the display element layer disposed on the substrate, and the protective layer disposed on the display element layer, wherein at least one of the substrate, the display element layer, or the protective layer may contain the light absorber of one or more embodiments. The display device containing the light absorber of one or more embodiments may prevent or reduce the damage by the light in the wavelength range of about 315 nm to about 400 nm, and the reliability of the display device may be improved.

The light absorber of one or more embodiments may absorb light in the wavelength range of about 315 nm to about 400 nm, thereby preventing or reducing the damage to the display device of one or more embodiments.

The display device of one or more embodiments may have improved reliability by including a light absorber having increased absorbance with respect to ultraviolet rays.

The light absorber of one or more embodiments may exhibit characteristics having improved heat resistance and increased absorbance with respect to ultraviolet rays.

Although the present disclosure has been described with reference to embodiments of the present disclosure, it will be understood that the present disclosure should not be limited to these embodiments, but that various changes and modifications can be made by those skilled in the art without departing from the spirit and scope of the present disclosure.

Accordingly, the technical scope of the present disclosure is not intended to be limited to the contents set forth in the detailed description of the specification, but is intended to be defined by the appended claims and their equivalents.

What is claimed is:

1. A display device comprising:
a substrate;
a display element layer on the substrate; and
a protective layer on the display element layer,
wherein at least one of the substrate, the display element layer, or the protective layer comprises a light absorber represented by Formula 1:

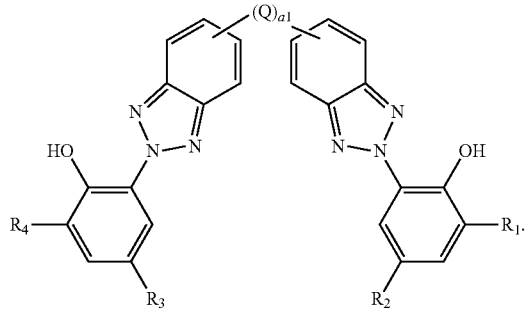

Formula 1 and wherein, in Formula 1, a1 is an integer of 1 to 10,

Q is represented by any one among Q1 and Q3 to Q9:

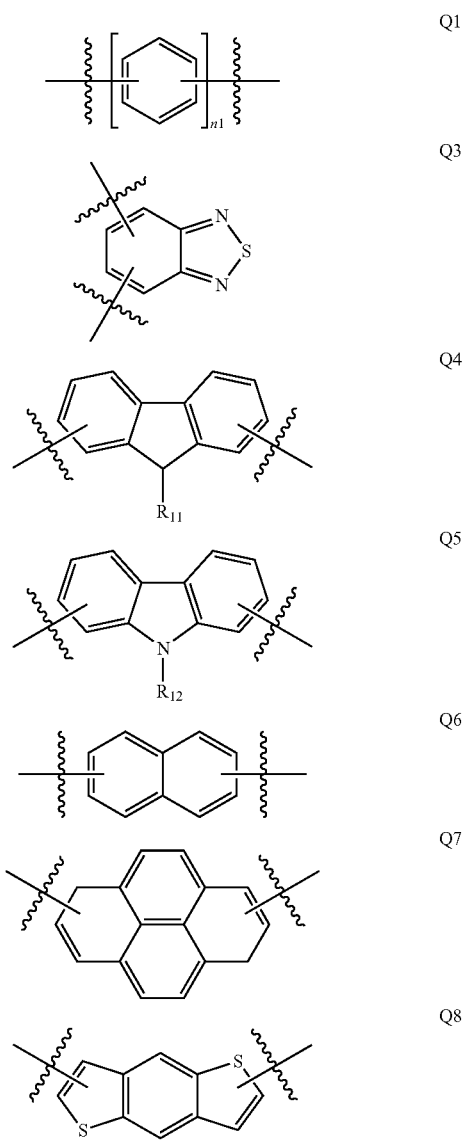

-continued

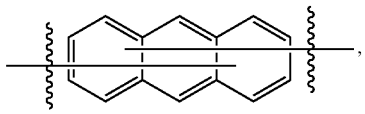
Q9 wherein in Q1, n1 is an integer of 2 to 10, and
in Q4 and Q5, $R_{11}$ and $R_{12}$ are each independently a substituted or unsubstituted alkyl group having 1 to 10 carbon atoms, and
$R_1$ to $R_4$ are each independently a hydrogen atom, a deuterium atom, a halogen atom, a substituted or unsubstituted alkyl group having 1 to 20 carbon atoms, a substituted or unsubstituted aryl group having 6 to 30 ring-forming carbon atoms, or a substituted or unsubstituted heteroaryl group having 2 to 30 ring-forming carbon atoms.

2. The display device of claim 1, wherein the substrate and the protective layer each have a transmittance of about 85% or more in a wavelength range of about 400 nm to about 800 nm.

3. The display device of claim 1, wherein the display element layer comprises a plurality of light emitting elements, each of the plurality of light emitting elements comprising a first electrode and a second electrode facing each other, an emission layer between the first electrode and the second electrode, and a pixel defining film between the respective first electrodes of adjacent ones of the plurality of light emitting elements, and
the pixel defining film comprises the light absorber.

4. The display device of claim 3, wherein the display element layer further comprises an encapsulation layer on the second electrode, and
the encapsulation layer comprises the light absorber.

5. The display device of claim 1, wherein one of the substrate, the display element layer, or the protective layer comprises the light absorber, and
the one of the light absorber in the substrate, the display element layer, or the protective layer comprising the light absorber is about 0.03 to 0.50 wt % and exclusive of 0.50 wt % in content based on a total weight of the one of the substrate, the display element layer, or the protective layer.

6. The display device of claim 1, wherein the light absorber is to absorb light in a wavelength range of about 315 nm to about 400 nm.

7. The display device of claim 1, wherein the light absorber has a maximum value of absorbance of about 0.25 to about 0.45 in a wavelength range of about 315 nm to about 400 nm.

8. The display device of claim 1, wherein the light absorber has a maximum value of absorbance in a wavelength range of about 350 nm to about 370 nm.

9. The display device of claim 1, wherein Formula 1 is bilaterally symmetrical with respect to Q.

10. The display device of claim 1, wherein in Formula 1, $R_1$ and $R_4$ are the same, and $R_2$ and $R_3$ are the same.

11. The display device of claim 1, wherein in Formula 1, $R_1$ to $R_4$ are each independently a substituted or unsubstituted alkyl group having 1 to 10 carbon atoms, a substituted or unsubstituted aryl group having 6 to 20 ring-forming carbon atoms, or a substituted or unsubstituted heteroaryl group having 2 to 20 ring-forming carbon atoms.

12. The display device of claim 1, wherein Formula 1 is represented by Formula 1-A:

Formula 1-A

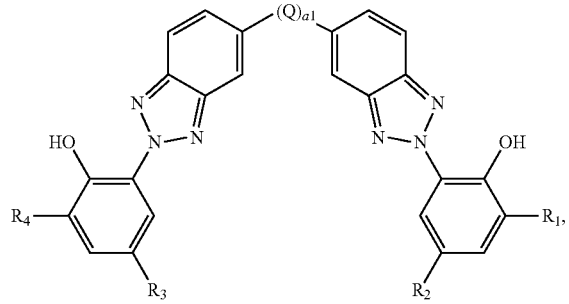

and
wherein in Formula 1-A, $R_1$ to $R_4$, a1 and Q are the same as defined in Formula 1.

13. The display device of claim 1, wherein the display device is a television, a monitor, an external billboard, a personal computer, a laptop computer, a personal digital terminal, a car navigation unit, a game console, a smart phone, a tablet or a camera.

14. A light absorber represented by Formula 1:

Formula 1

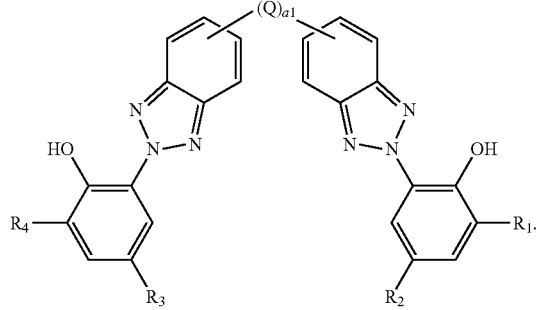

wherein, in Formula 1,
a1 is an integer of 1 to 10,
Q is represented by any one among Q1 and Q3 to Q9:

Q1
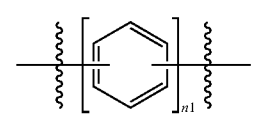

Q3
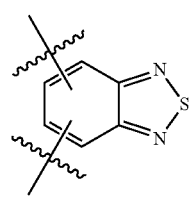

Q4
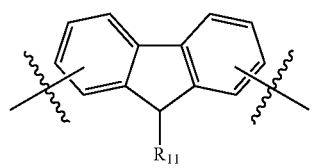

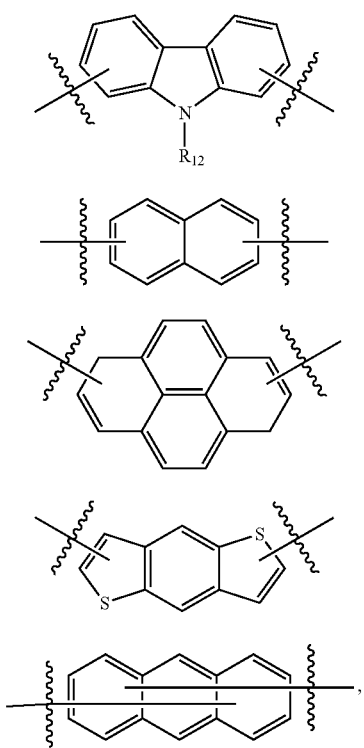

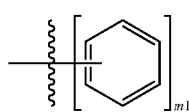

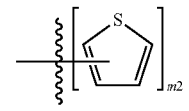

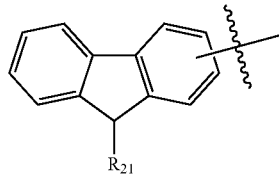

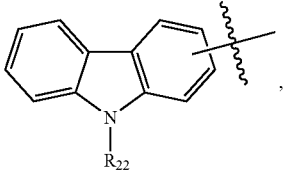

wherein in Q1, n1 is an integer of 2 to 10, and in Q4 and Q5, $R_{11}$ and $R_{12}$ are each independently a substituted or unsubstituted alkyl group having 1 to 10 carbon atoms, and $R_1$ to $R_4$ are each independently a hydrogen atom, a deuterium atom, a halogen atom, a substituted or unsubstituted alkyl group having 1 to 20 carbon atoms, a substituted or unsubstituted aryl group having 6 to 30 ring-forming carbon atoms, or a substituted or unsubstituted heteroaryl group having 2 to 30 ring-forming carbon atoms.

15. The light absorber of claim 14, wherein the light absorber is to absorb ultraviolet rays.

16. The light absorber of claim 14, wherein a maximum value of absorbance in a wavelength range of about 315 nm to about 400 nm of the light absorber is about 0.25 to about 0.45.

17. The light absorber of claim 14, wherein $R_1$ to $R_4$ are each independently represented by any one among R-1 to R-4:

and
wherein in R-1 and R-2, m1 and m2 are each independently an integer of 1 to 10, and
in R-3 and R-4, $R_{21}$ and $R_{22}$ are each independently a substituted or unsubstituted alkyl group having 1 to 10 carbon atoms.

18. The light absorber of claim 14, wherein Formula 1 is bilaterally symmetrical with respect to Q.

19. A light absorber wherein, the light absorber is represented by Light absorber 2:

Light absorber 2

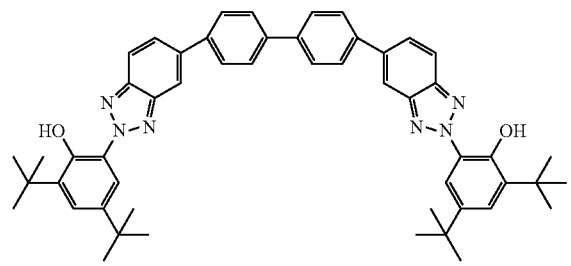

* * * * *